US012767037B2

(12) United States Patent
Robertson et al.

(10) Patent No.: US 12,767,037 B2
(45) Date of Patent: Oct. 20, 2026

(54) ASSEMBLY PLANT HEADLAMP AIMING RELIEF METHOD

(71) Applicant: Ford Global Technologies, LLC, Dearborn, MI (US)

(72) Inventors: Michael Robertson, West Bloomfield, MI (US); Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 316 days.

(21) Appl. No.: 18/607,985

(22) Filed: Mar. 18, 2024

(65) Prior Publication Data

US 2025/0289359 A1 Sep. 18, 2025

(51) Int. Cl.

*B60Q 1/068* (2006.01)
*B60Q 1/06* (2006.01)
*B60Q 1/072* (2006.01)
*B60Q 1/076* (2006.01)
*B60Q 1/08* (2006.01)
*F21S 41/657* (2018.01)
*F21S 41/675* (2018.01)
*G01M 11/06* (2006.01)

(52) U.S. Cl.

CPC ........... *B60Q 1/0683* (2013.01); *B60Q 1/072* (2013.01); *B60Q 1/06* (2013.01); *B60Q 1/076* (2013.01); *B60Q 1/08* (2013.01); *F21S 41/657* (2018.01); *F21S 41/675* (2018.01); *G01M 11/06* (2013.01); *G01M 11/064* (2013.01)

(58) Field of Classification Search

CPC ........ B60Q 1/06; B60Q 1/076; B60Q 1/0683; B60Q 1/08; G01M 11/06; G01M 11/064; F21S 41/657; F21S 41/675

USPC ............................................ 700/59; 362/465

See application file for complete search history.

(56) References Cited

U.S. PATENT DOCUMENTS 2,722,853 A * 11/1955 Knosp .................... G05B 19/39 269/60
4,134,680 A * 1/1979 Hunter ................. G01M 11/061 327/515
5,622,421 A 4/1997 Turley, Jr. et al.
5,877,680 A * 3/1999 Okuchi .................. B60Q 1/115 362/464
6,913,374 B2 7/2005 Burton
8,422,004 B1 * 4/2013 Ekladyous ............ G01J 1/4214 356/127
8,605,269 B2 * 12/2013 Yotz ..................... G01M 11/064 382/104

(Continued)

FOREIGN PATENT DOCUMENTS

CN 103868678 A 6/2014
CN 107389321 A 11/2017

(Continued)

*Primary Examiner* — Ronald D Hartman, Jr.

(74) *Attorney, Agent, or Firm* — Vichit Chea; Carlson, Gaskey & Olds, P.C.

(57) ABSTRACT

A system and method include the following. An aim of a vehicle lamp assembly is adjusted by moving a lamp component in a first direction. It is then determined if a beam pattern from the vehicle lamp assembly is within a predetermined range after adjustment. The lamp component is then moved in a second direction by a predetermined mount if the beam pattern is within the predetermined range.

19 Claims, 6 Drawing Sheets

(56) References Cited

U.S. PATENT DOCUMENTS

| | | | | |
|---|---|---|---|---|
| 11,850,994 | B2 | 12/2023 | Shim et al. | |
| 2003/0117810 | A1 * | 6/2003 | Nakazawa | B60Q 1/0683 362/273 |
| 2005/0088852 | A1 * | 4/2005 | Aguinaga | B60Q 1/076 362/524 |
| 2006/0239019 | A1 * | 10/2006 | Kiyota | G01M 11/064 362/465 |
| 2007/0035268 | A1 * | 2/2007 | Goto | B60Q 1/076 318/685 |
| 2013/0058111 | A1 | 3/2013 | Ekladyous et al. | |
| 2013/0088711 | A1 * | 4/2013 | Ekladyous | G01M 11/064 356/121 |
| 2021/0162912 | A1 | 6/2021 | Spero | |
| 2023/0112973 | A1 * | 4/2023 | Paradis | G01M 11/062 29/428 |

FOREIGN PATENT DOCUMENTS

| | | | | |
|---|---|---|---|---|
| CN | 111149141 | A | | 5/2020 |
| CN | 115629636 | A | * | 1/2023 |
| JP | 02162130 | A | | 6/1990 |
| JP | H08122212 | A | | 5/1996 |
| JP | 2019156277 | A | | 9/2019 |
| KR | 101934797 | B1 | | 1/2019 |
| KR | 102350167 | B1 | | 1/2022 |

* cited by examiner

ASSEMBLY PLANT HEADLAMP AIMING RELIEF METHOD

TECHNICAL FIELD

This disclosure relates generally to a method and system that is used to relieve tension that is built up within a headlamp assembly during aim adjustment without changing the aim.

BACKGROUND

Vehicles include many different types of lamp assemblies, such as headlamps for example. These lamps must be adjusted during assembly of the vehicle to ensure that the aim of the lamps is within a specified target range.

SUMMARY

A method according to an exemplary aspect of the present disclosure includes, among other things: adjusting an aim of a vehicle lamp assembly by moving a lamp component in a first direction; determining if a beam pattern from the vehicle lamp assembly is within a predetermined range after adjustment; and moving the lamp component in a second direction by a predetermined mount if the beam pattern is within the predetermined range.

In a further non-limiting embodiment of the foregoing method, the second direction is opposite of the first direction.

In a further non-limiting embodiment of any of the foregoing methods, the method includes rotating the lamp component in the first direction about an adjustment axis.

In a further non-limiting embodiment of any of the foregoing methods, the lamp component comprises a geared screw adjuster with a screw that turns about the adjustment axis.

In a further non-limiting embodiment of any of the foregoing methods, the method includes coupling an adjustment tool to the geared screw adjuster to rotate the screw to adjust the aim.

In a further non-limiting embodiment of any of the foregoing methods, the method includes coupling the screw to a motor sled associated with an adjustment motor of the vehicle lamp assembly.

In a further non-limiting embodiment of any of the foregoing methods, the motor sled includes a threaded arm that is coupled to the screw, and the method includes moving the motor sled along a guide channel during adjustment to the predetermined range.

In a further non-limiting embodiment of any of the foregoing methods, friction between the guide channel and the motor sled during adjustment generates a binding force causing the threaded arm to flex out of a nominal position, and the method includes rotating the lamp component in the second direction, opposite the first direction, about the adjustment axis to relieve the binding force and return the threaded arm to the nominal position.

In a further non-limiting embodiment of any of the foregoing methods, the method includes only moving in the second direction once the beam pattern is within a predetermined range.

In a further non-limiting embodiment of any of the foregoing methods, movement in the second direction has no effect on the aim.

In a further non-limiting embodiment of any of the foregoing methods, wherein, if the beam pattern is not within the predetermined range, the method includes subsequently:

a) moving the lamp component in one of the first direction and second direction if the beam pattern is above the predetermined range;
b) moving the lamp component in the other of the first direction and second direction if the beam pattern is below the predetermined range;
c) repeating steps a) and b) until the beam pattern is within the predetermined range; and
d) moving the lamp component by the predetermined amount in an opposite direction as compared to a final movement direction to complete step c).

A system according to another exemplary aspect of the present disclosure includes, among other things: a vehicle lamp assembly including a lamp component that is moved via an adjustment mechanism in a first direction to adjust an aim of the vehicle lamp assembly; one or more controllers configured to determine if a beam pattern from the vehicle lamp assembly is within a predetermined range after adjustment; and wherein the adjustment mechanism moves the lamp component in a second direction by a predetermined amount if the beam pattern is within the predetermined range.

In a further non-limiting embodiment of the foregoing system, the second direction is opposite of the first direction.

In a further non-limiting embodiment of any of the foregoing systems, the lamp component comprises a geared screw adjuster with a screw that turns about an adjustment axis.

In a further non-limiting embodiment of any of the foregoing systems, an adjustment tool is coupled to the geared screw adjuster to rotate the screw to adjust the aim.

In a further non-limiting embodiment of any of the foregoing systems, the screw is coupled to a motor sled associated with an adjustment motor of the vehicle lamp assembly.

In a further non-limiting embodiment of any of the foregoing systems, the motor sled includes a threaded arm that is coupled to the screw, and wherein the motor sled is moved along a guide channel during adjustment to the predetermined range.

In a further non-limiting embodiment of any of the foregoing systems, friction between the guide channel and the motor sled during adjustment generates a binding force causing the threaded arm to flex out of a nominal position, and wherein the lamp component is rotated by the adjustment mechanism in the second direction, opposite the first direction, about the adjustment axis to relieve the binding force and return the threaded arm to the nominal position.

In a further non-limiting embodiment of any of the foregoing systems, the adjustment mechanism only moves the lamp component the second direction once the beam pattern is within a predetermined range, and wherein movement in the second direction has no effect on the aim.

In a further non-limiting embodiment of any of the foregoing systems, wherein, if the beam pattern is not within the predetermined range:

the adjustment mechanism subsequently moves the lamp component in one of the first direction and second direction if the beam pattern is above the predetermined range;

the adjustment mechanism subsequently moves the lamp component in the other of the first direction and second direction if the beam pattern is below the predetermined range; and wherein once the beam pattern is within the predetermined range, the adjustment mechanism subsequently moves the lamp component by the predetermined amount in an opposite direction as compared to a final movement direction move the beam pattern to the predetermined range.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a system and method that is used to relieve tension that is built up within a headlamp assembly during aim adjustment without changing the aim of a headlamp. These and other features are discussed in greater detail in the following paragraphs of this detailed description.

Figure 1:
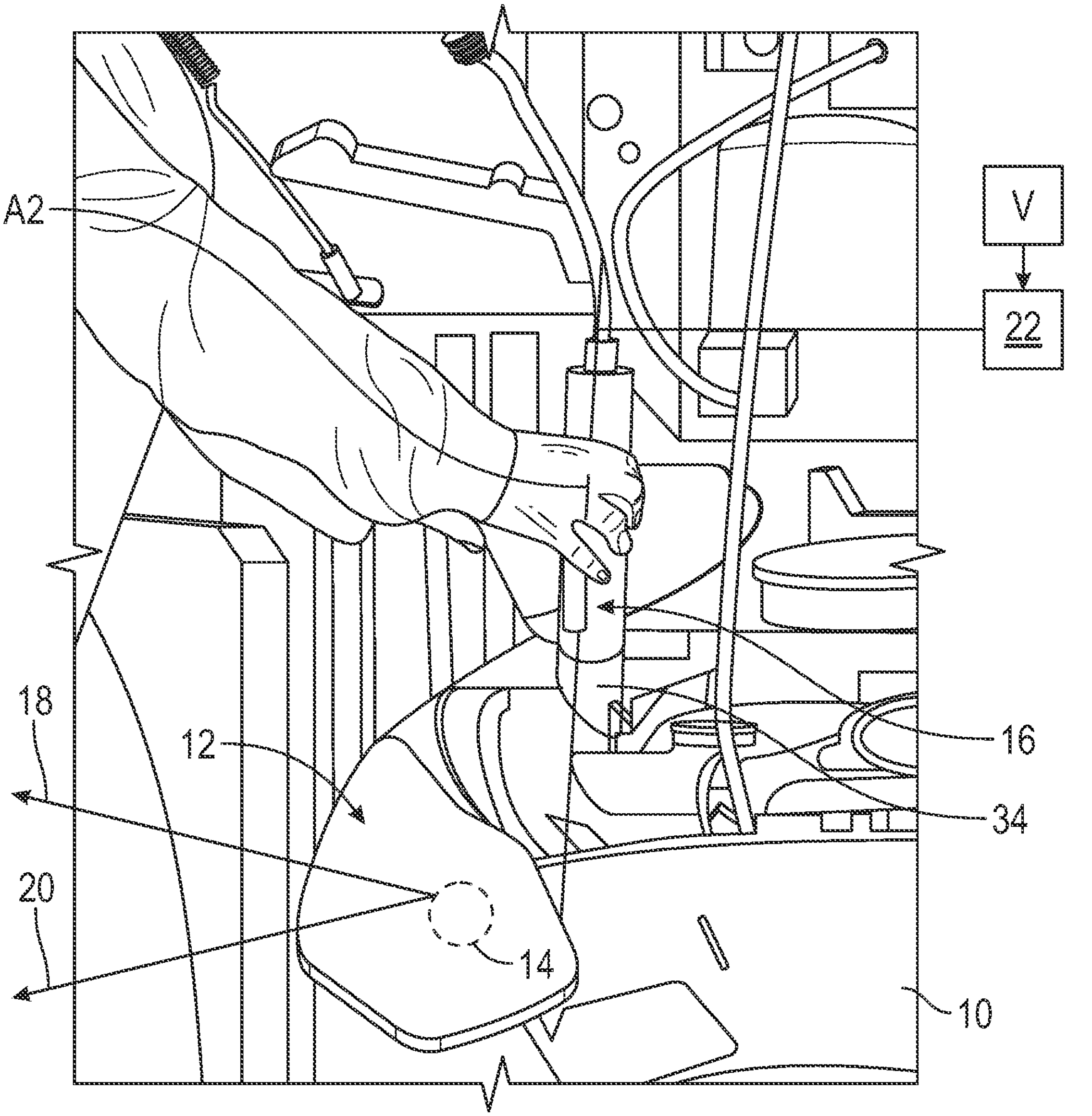
FIG. 1 illustrates a front end portion of a vehicle with a headlamp assembly and adjusting tool.

FIG. 1 illustrates a vehicle 10 that includes a vehicle lamp assembly 12 including a lamp component, schematically shown at 14, that is moved via an adjustment mechanism 16 to adjust an aim of the vehicle lamp assembly 12. For example, the adjustment mechanism 16 can adjust the aim up 18 or down 20. A control system 22 is configured to determine if a beam pattern from the vehicle lamp assembly 12 achieves a desired predetermined target range after adjustment. If the beam pattern meets the desired target, the adjustment mechanism 16 moves the lamp component 14 in an opposite direction to the last direction of movement by a predetermined mount to relieve tension generated during adjustment. The adjustment mechanism 16 only moves the lamp component 14 in the opposite direction once the beam pattern is within the predetermined target range. Additionally, this movement in the opposite direction has no effect on the aim.

Figure 2:
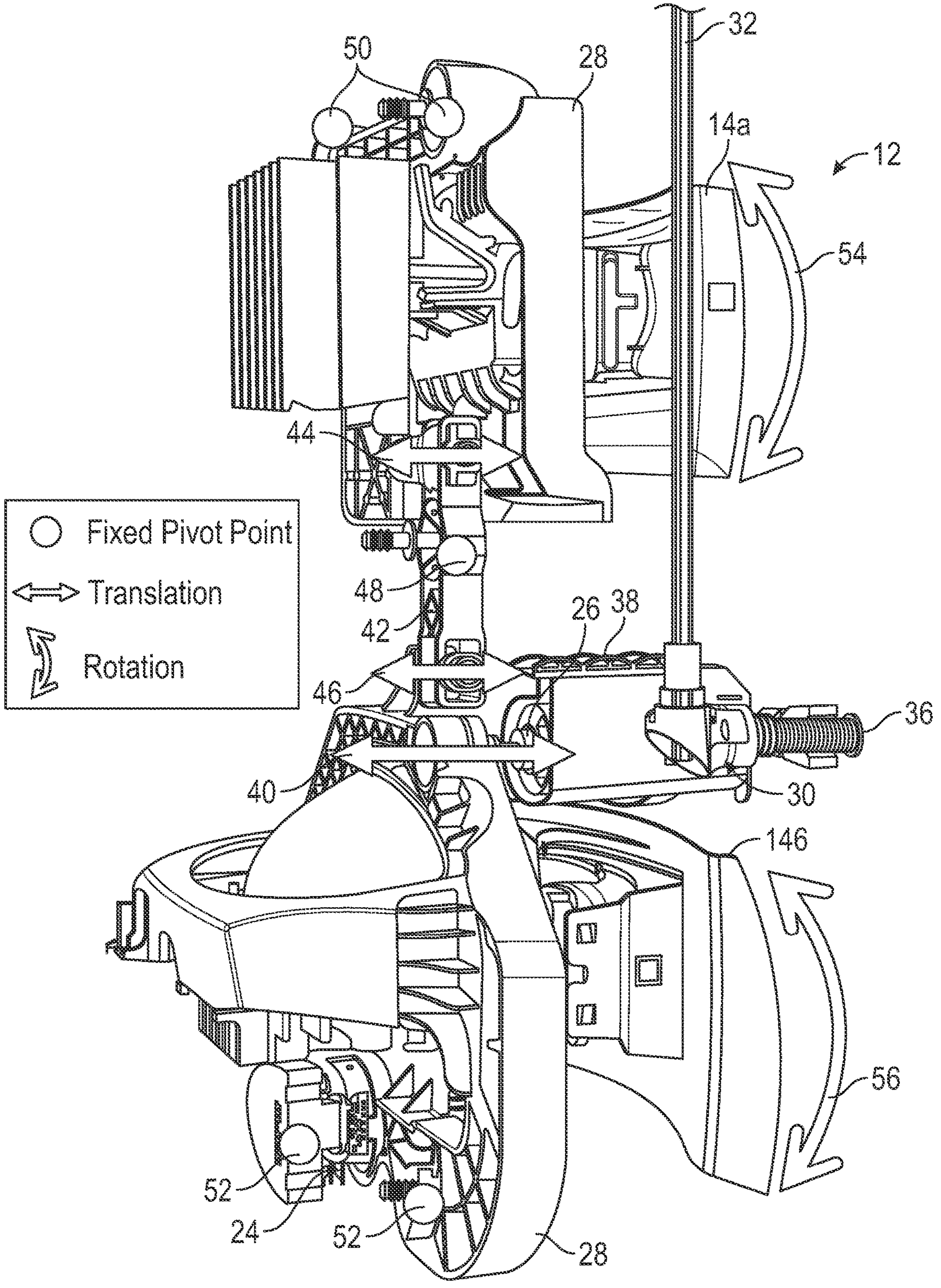
FIG. 2 is a rear perspective view of a headlamp assembly.

FIG. 2 shows one example of a lamp assembly 12. In this example, the vehicle lamp assembly 12 comprises a headlamp assembly; however, the subject system and aiming method could also be used with other types of lamp assemblies. In one example, the lamp assembly 12 includes an upper headlamp component 14*a* and a lower headlamp component 14*b* that need to have their aim adjusted.

In one example, internal mechanisms to the lamp assembly 12 may include a horizontal motor 24 that is used to provide swiveling movement, e.g., right to left swiveling, of the lamp assembly 12 as the vehicle goes through turns. A vertical motor 26 may also be included to provide auto-leveling of the lamp assembly 12 during vehicle operation based on pitch. A bracket assembly 28 is used to mount the horizontal motor 24 and the vertical motor 26 on a vehicle structure.

In one example, a system for adjusting the lamp assembly 12 includes an adjuster 30 coupled to an input drive rod 32, which is coupled to the adjustment mechanism 16, which comprises, for example, an adjusting tool 34 (FIG. 1). In one example, the adjusting tool 34 comprises an automated tool that provides rotating drive input to the drive rod 32. Those skilled in the art who have the benefit of this description will be able to determine the type of automated tool that would be applied for these purposes. In one example, the adjuster 30 comprises a 90 degree geared screw adjuster that includes a drive screw 36. The drive screw 36 is coupled to a moveable motor sled 38, which is associated with the vertical motor 26 and moves in translation as indicated by arrow 40.

The lamp assembly 12 also includes a connecting rod 42 that connects the upper lamp component 14*a* and the lower lamp component 14*b* together. The connecting rod 42 is used to translate movement of the lower lamp component 14*b* to the upper lamp component 14*a*. The connecting rod 42 moves in translation at opposing ends, as indicated by arrows 44, 46, and pivots about fixed pivot point 48. Other fixed pivot points for the lamp assembly 12 include upper pivot points 50 and lower pivot points 52. The upper lamp component 14*a* can be rotated as indicated at 54 and the lower lamp component 14*b* can be rotated as indicated at 56.

As known, per headlamp requirements and performance needs, all vehicle headlamps require an aiming system to aim the headlamps to be within a defined tolerance range. This is achieved through moving mechanisms internal to the headlamp. As discussed above, these mechanisms have many moving parts and can be complex. During aiming, these mechanisms have tolerances that shift, and can flex, bind-up, and create tension in the system. As a result, external forces such as hood slam, road bumps, vibration inputs, and thermal loads, for example, may cause the initially preset aim to change, e.g., move out of the defined factory set tolerance range. It is known that even very small movements of internal components of the lamp assembly associated with aiming can result in large changes of overall headlamp beam aim. For example, a 0.46 mm (0.02 inches) shift in a position of the motor sled 38 results in a shift of 25.4 mm (1 inch) aim at 25 feet, which is a typical distance at which the aim requirements are set. The subject disclosure provides a system and aiming method for the assembly plant that reduces variability and the tendency of headlamp internal mechanisms to shift and move after the aim has been set to meet the preset aim tolerance range.

Figure 3B:
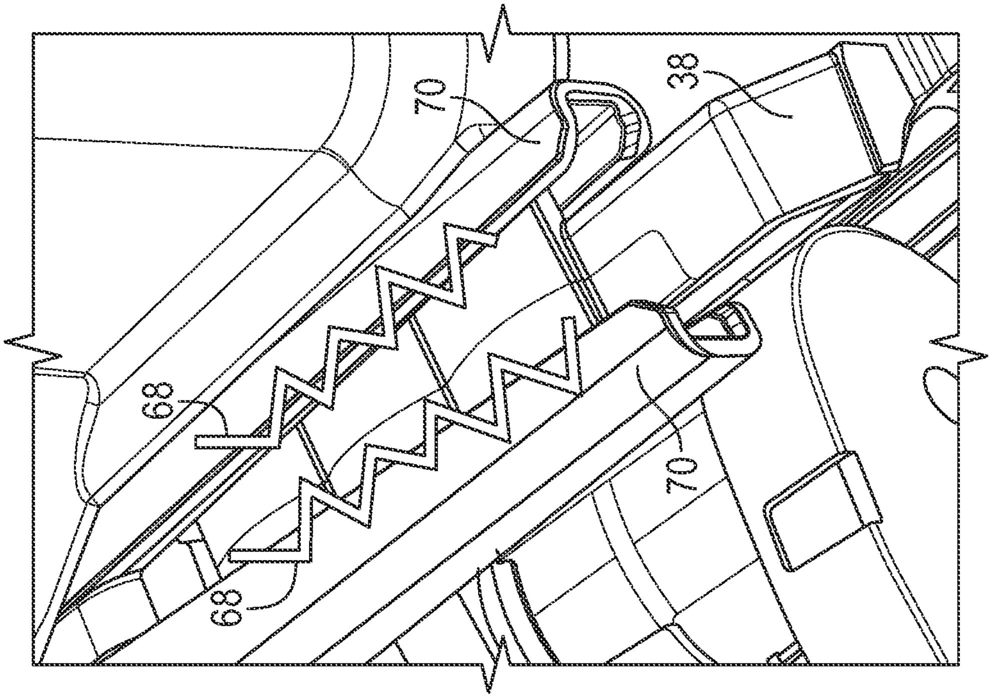
FIG. 3B is a view similar to FIG. 3A but showing bound-up tension between the motor sled and an associated guide channel.
Figure 3A:
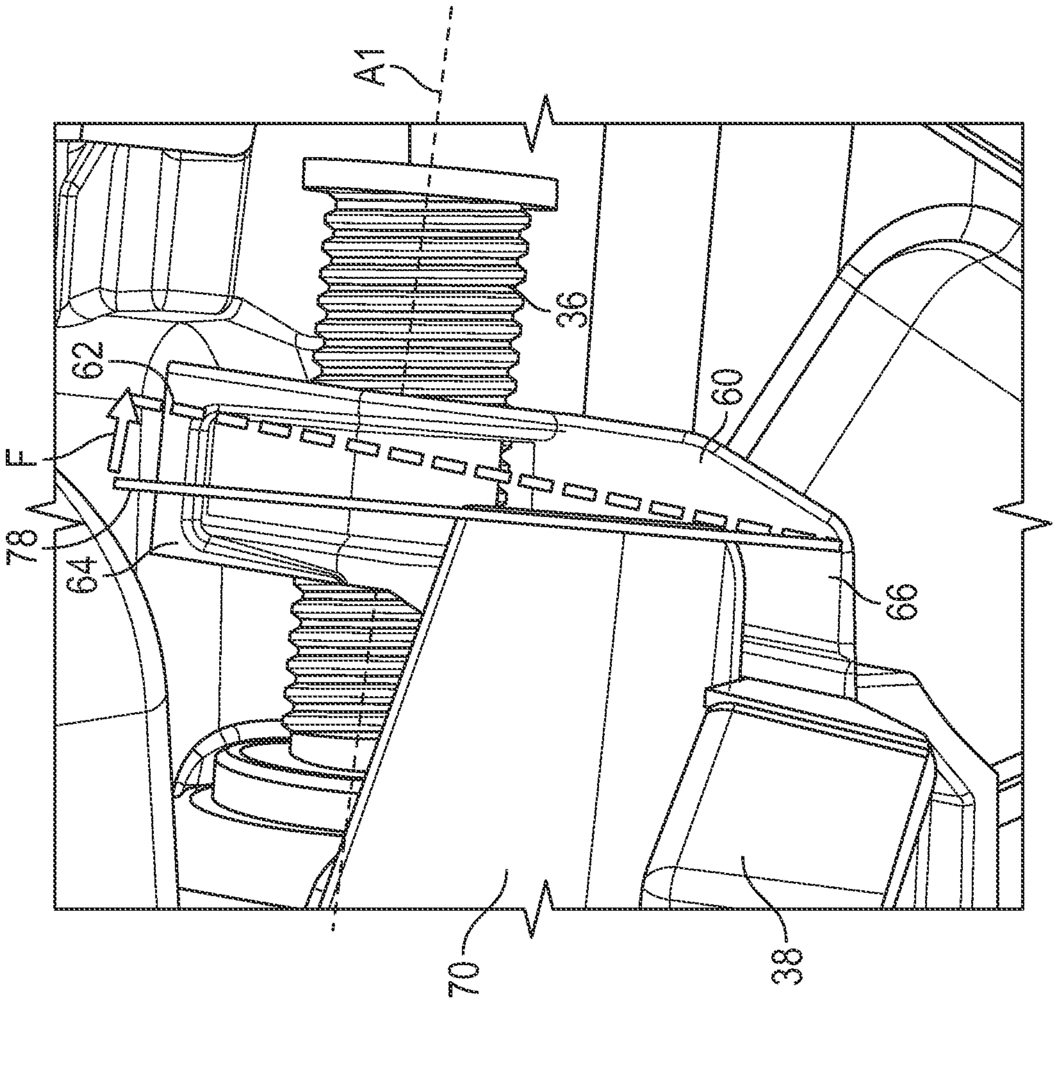
FIG. 3A is a magnified perspective view of a screw and motor sled interface during adjustment.

As shown in FIGS. 3A-3B, an arm 60 of the motor sled 38 is coupled to the drive screw 36, which rotates about a first axis of rotation A1. In one example, the arm 60 has a threaded interface connection to the drive screw 36. In one example, the arm 60 moves the motor sled 38 along a guide channel 70 during adjustment to the target range. The input drive rod 32, which is coupled to the adjusting tool 34, is used to rotate the drive screw 36 via the geared screw adjuster 30 to provide adjustment. The adjusting tool 34 rotates about a second axis of rotation A2 (FIG. 1) which is non-parallel to the first axis of rotation A1. During adjustment, the drive screw 36 rotates about the first axis of rotation A1 to drive the arm 60 along a linear translation path to adjust a position of the motor sled 38 until the predefined nominal aim target 72 (FIG. 4) is reached.

Figure 4:
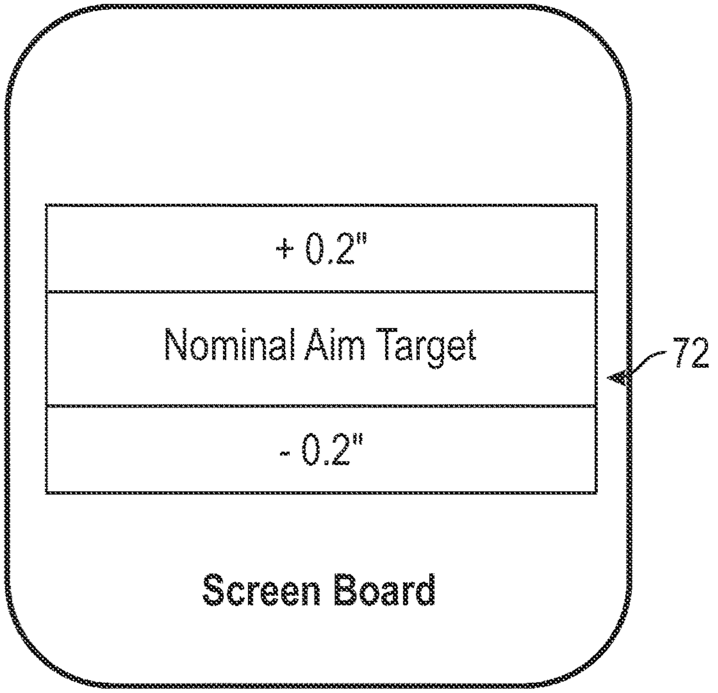
FIG. 4 schematically illustrates a desired range for adjusting the headlamp assembly of FIG. 2 using the adjusting tool.

During this translational movement, the arm 60 is caused to flex F relative to the motor sled 38 from a nominal position 78 to an offset position 62 as shown in FIG. 3A. In other words, the distal end 64 of the arm 60 is cantilevered away from a base end 66 of the arm 60 that is connected to the motor sled 38. The friction between the guide channel 70 and the motor sled 38, caused by the flexing movement during adjustment, generates a built up tension, or binding force (schematically shown at 68), between the motor sled 38 and the associated guide channel 70 as shown in FIG. 3B. This binding force 68 remains within the lamp assembly 12 once the lamp assembly 12 has been adjusted to reach the predefined nominal aim target 72 as indicated in FIG. 4. Subsequent vibration input events, e.g., hood slam for example, can release this force, causing internal movement of mechanisms, which can then change/shift the aim.

Figure 5A:
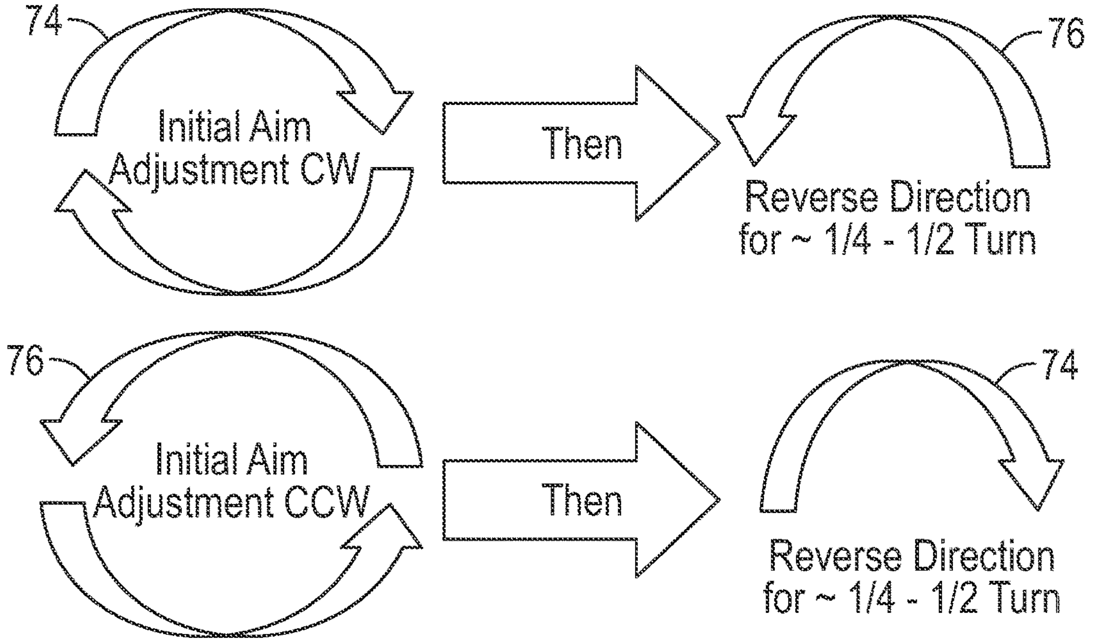
FIG. 5A shows tool rotation for releasing the bound-up tension.
Figure 5B:
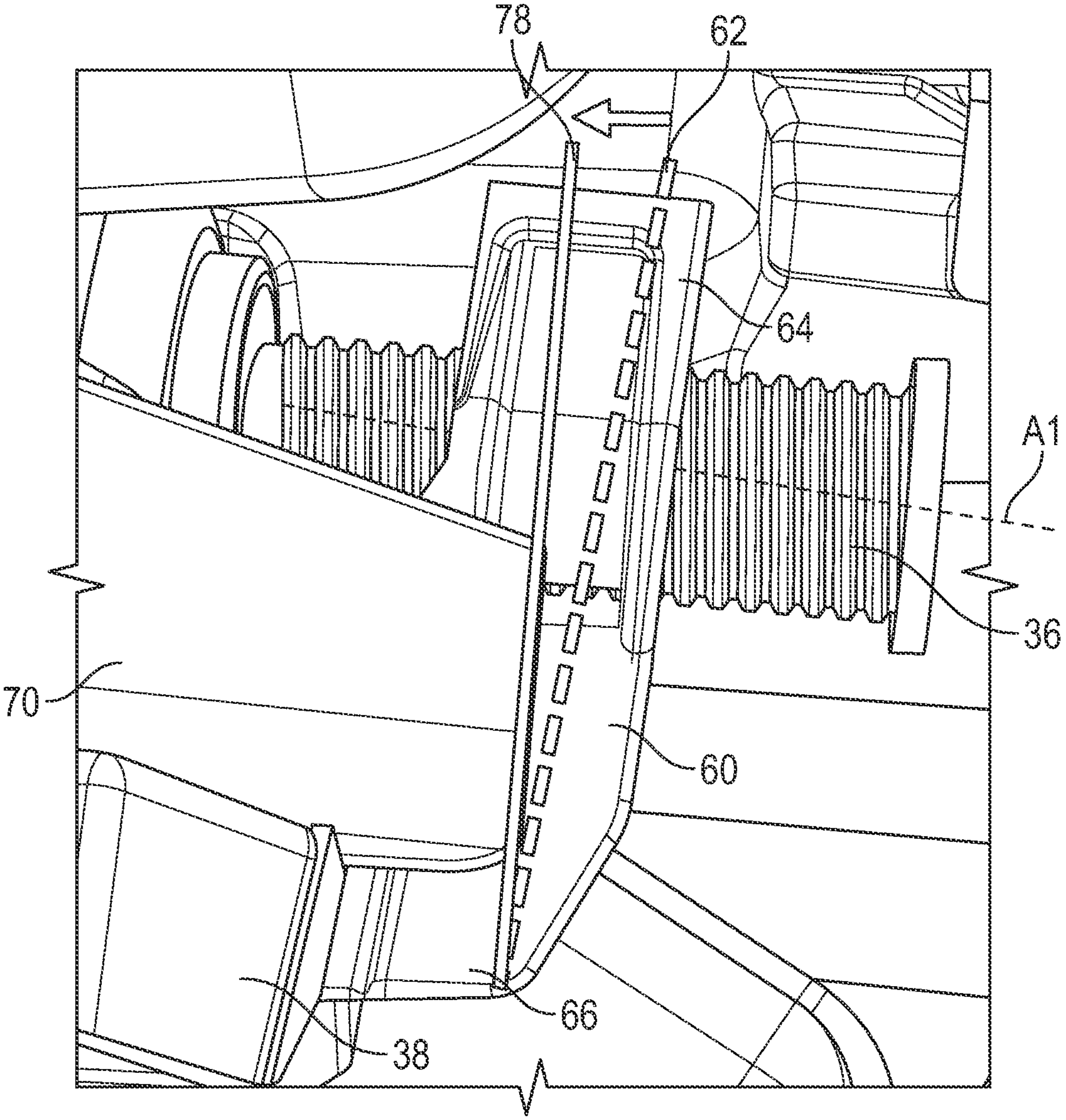
FIG. 5B is similar to FIG. 3A but showing the bound-up tension released.

As shown in FIG. 5A, the initial aim adjustment can occur either by a clockwise (CW) adjustment 74 or a counter-clockwise (CCW) adjustment 76. Determination of the initial adjustment rotation direction is based on each individual lamp assembly 12 due to various tolerance stack-ups that are unique to each assembly. Once the predefined nominal aim target 72 is reached, to relieve the binding force 68, the adjusting tool 34 is then rotated in an opposite direction of the last movement by a predetermined amount. In one example, the predetermined amount can be a quarter to half a turn of the tool 34, for example; however, the amount is determined based on the tool and the type of headlamp assembly. Once this final reverse adjustment is made, the binding force 68 is released and the arm 60 returns to a nominal position 78 as shown in FIG. 5B.

It should be noted that this final reverse adjustment does not change the aim or move any parts in the assembly relative to others. This adjustment simply releases the tension and binding by removing any flex or bending in the components. The final reverse adjustment returns associated components to a neutral/nominal state to relieve bound up energy such that it cannot be released during a vibration event such as a hood slam, for example.

Figure 6:
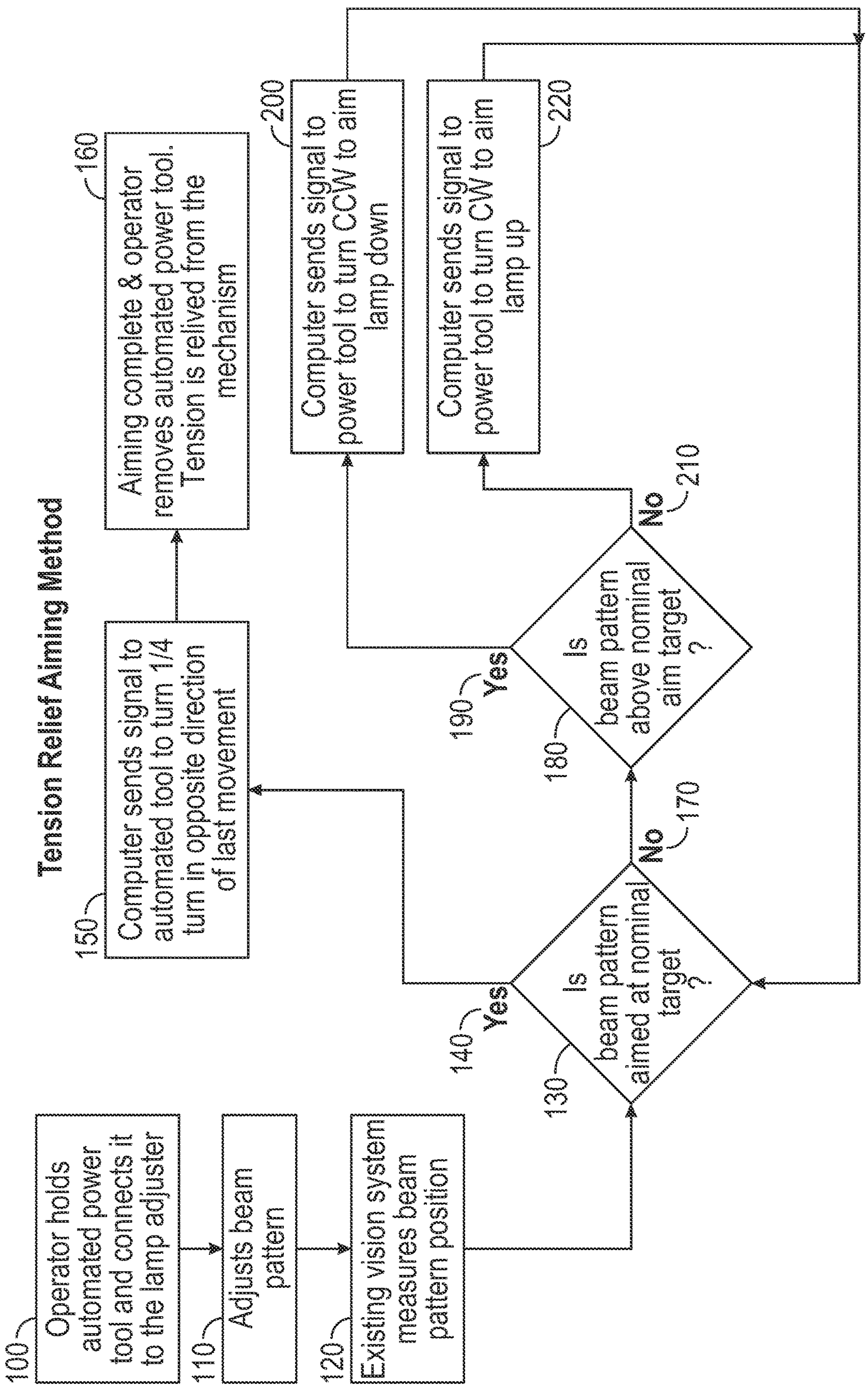
FIG. 6 is a flow diagram of a method of adjusting the headlamp assembly.

FIG. 6 shows a flow diagram of one example method of the disclosure. In a first step 100, an operator connects the adjustment tool 34 to the lamp adjuster 30. Next, at step 110, the adjusting tool 34 adjusts the beam pattern. The step 110 of adjusting the aim of the vehicle lamp assembly 12 can occur by moving, e.g., rotating, the lamp component 14 in a first direction (CW or CCW), and then subsequently using a vision system V (FIG. 1) to measure beam pattern position as indicated at step 120. Those skilled in the art who have the benefit of this description will be able to determine the type of vision system that would be applied for these purposes.

As discussed above, in one example, the adjusting tool 34 comprises an automated tool that is associated with a control system 22. The vision system V is also associated with, and in communication with, the control system 22. The control system 22 comprises one or more controllers that are used to control operation of the tool 34 and can measure the beam pattern position to determine whether it meets the desired/predetermined target criteria, e.g., nominal target range 72. The one or more controllers can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The one or more controllers may be a hardware device for executing software, particularly software stored in memory. The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory. The one or more controllers can be configured to execute software stored within the memory, to communicate data to and from the memory, and to generally control operations of the computing device pursuant to the software. Software in memory, in whole or in part, is read by the processor, perhaps buffered within the processor, and then executed.

In one example, an automated program in the in the tool software is used to adjust aim for the lamp assembly 12 as described above. After the measuring step 120, the control system determines if the beam pattern from the vehicle lamp assembly is within the predefined nominal aim target range 72 after adjustment, as indicated at step 130. If the determination is "YES", as indicated at 140, the control system sends a signal to the automated tool 34 to turn a predetermined amount in an opposite direction of the last direction movement as indicated at step 150. Finally, the aiming is complete, the tension is relieved, and the operator removes the tool 34 as indicated at 160. The aim is thus set in the factory/plant and any subsequent load input (e.g., hood slam, road bumps, etc.) will not affect the initial aim settings.

In one example, the method includes only moving in the opposite direction once the beam pattern is within a predetermined range. Further, this final movement of adjustment in the opposite direction has no effect on the aim of the lamp assembly.

In one example, if the answer to step 130 is "NO" (i.e., the beam pattern from the vehicle lamp assembly is not within the predefined nominal aim target range 72), as indicated at step 170; the control system then determines whether the beam pattern is above the predefined nominal aim target range 72, as indicated at step 180. If the beam pattern is determined to be above the predefined nominal aim target range 72 (step 190), the control system sends a signal to the tool 34 to rotate in a first direction, e.g., a CCW direction, to aim the lamp down as indicated at step 200. Step 130 is then repeated to determine if the beam pattern is at the predefined nominal aim target range 72. If "YES" 140, then steps 150 and 160 are performed. IF "NO" 170, step 180 is performed.

If the beam pattern is determined to be below the predefined nominal aim target range 72 (step 210), the control system sends a signal to the tool 34 to rotate in a second direction, opposite of the first direction, e.g., a CW direction, to aim the lamp up as indicated at step 220. Step 130 is then repeated to determine if the beam pattern is at the predefined nominal aim target range 72. If "YES" 140, then steps 150 and 160 are performed. IF "NO" 170, step 180 is performed. Thus, 180 and associated steps 200, 220 are repeated until the beam pattern is within the predefined nominal aim target range 72.

The subject disclosure provides for an adjustment system and method that reduces movement of mechanical parts inside of headlamps that would affect the aiming system after initial settings have been achieved. By rotating the adjustment tool by a small predetermined amount in an direction opposite to the last direction of movement, tension and bound up energy are relieved This increases headlamp aim capability and stability, and can be easily programed and tuned for each assembly plant and each specific lamp because based on design/geometry, each lamp will require a different amount of "relief". Testing in the lab with high-speed camera footage has been done and the results have shown that there is a significant benefit for the aiming system as the tension generated during initial aiming is relieved and subsequent vibrational inputs do not change the aim.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A method comprising:
adjusting an aim of a vehicle lamp assembly by moving a lamp component in a first direction;
determining if a beam pattern from the vehicle lamp assembly is within a predetermined range after adjustment; and
moving the lamp component in a second direction by a predetermined amount if the beam pattern is within the predetermined range, wherein movement in the second direction relieves a binding force generated by friction during the adjustment in the first direction. and wherein the movement in the second direction has no effect on the aim of the vehicle lamp assembly.

2. The method of claim 1, wherein the second direction is opposite of the first direction.

3. The method of claim 1, including rotating the lamp component in the first direction about an adjustment axis.

4. The method of claim 3, wherein the lamp component comprises a geared screw adjuster with a screw that turns about the adjustment axis.

5. The method of claim 4, including coupling an adjustment tool to the geared screw adjuster to rotate the screw to adjust the aim.

6. The method of claim 4, including coupling the screw to a motor sled associated with an adjustment motor of the vehicle lamp assembly.

7. The method of claim 6, wherein the motor sled includes a threaded arm that is coupled to the screw, and including moving the motor sled along a guide channel during adjustment to the predetermined range.

8. The method of claim 1, including only moving in the second direction once the beam pattern is within a predetermined range.

9. The method of claim 1, wherein, if the beam pattern is not within the predetermined range, subsequently:
a) moving the lamp component in one of the first direction and second direction if the beam pattern is above the predetermined range;
b) moving the lamp component in the other of the first direction and second direction if the beam pattern is below the predetermined range;
c) repeating steps a) and b) until the beam pattern is within the predetermined range; and
d) moving the lamp component by the predetermined amount in an opposite direction as compared to a final movement direction to complete step c).

10. A method comprising:
adjusting an aim of a vehicle lamp assembly by moving a lamp component in a first direction;
rotating the lamp component in the first direction about an adjustment axis. wherein the lamp component comprises a geared screw adjuster with a screw that turns about the adjustment axis;
coupling the screw to a motor sled associated with an adjustment motor of the vehicle lamp assembly, wherein the motor sled includes a threaded arm that is coupled to the screw;
moving the motor sled along a guide channel during adjustment to a predetermined range;
determining if a beam pattern from the vehicle lamp assembly is within the predetermined range after adjustment:
moving the lamp component in a second direction by a predetermined amount if the beam pattern is within the predetermined range;
wherein friction between the guide channel and the motor sled during adjustment generates a binding force causing the threaded arm to flex out of a nominal position; and
rotating the lamp component in the second direction, opposite the first direction, about the adjustment axis to relieve the binding force and return the threaded arm to the nominal position.

11. A system comprising:
a vehicle lamp assembly including a lamp component that is moved via an adjustment mechanism in a first direction to adjust an aim of the vehicle lamp assembly;
one or more controllers configured to determine if a beam pattern from the vehicle lamp assembly is within a predetermined range after adjustment;
wherein the adjustment mechanism moves the lamp component in a second direction by a predetermined amount if the beam pattern is within the predetermined range; and
wherein movement in the second direction relieves a binding force generated by friction during the adjustment in the first direction, and wherein the movement in the second direction has no effect on the aim of the vehicle lamp assembly.

12. The system of claim 11, wherein the second direction is opposite of the first direction.

13. The system of claim 11, wherein the lamp component comprises a geared screw adjuster with a screw that turns about an adjustment axis.

14. The system of claim 13, including an adjustment tool that is coupled to the geared screw adjuster to rotate the screw to adjust the aim.

15. The system of claim 13, wherein the screw is coupled to a motor sled associated with an adjustment motor of the vehicle lamp assembly.

16. The system of claim 15, wherein the motor sled includes a threaded arm that is coupled to the screw, and wherein the motor sled is moved along a guide channel during adjustment to the predetermined range.

17. A system comprising:

a vehicle lamp assembly including a lamp component that is moved via an adjustment mechanism in a first direction to adjust an aim of the vehicle lamp assembly, wherein the lamp component comprises a geared screw adjuster with a screw that turns about an adjustment axis, and wherein the screw is coupled to a motor sled associated with an adjustment motor of the vehicle lamp assembly, wherein the motor sled includes a threaded arm that is coupled to the screw;

one or more controllers configured to determine if a beam pattern from the vehicle lamp assembly is within a predetermined range after adjustment, and wherein the motor sled is moved along a guide channel during adjustment to the predetermined range;

wherein the adjustment mechanism moves the lamp component in a second direction by a predetermined amount if the beam pattern is within the predetermined range; and wherein friction between the guide channel and the motor sled during adjustment generates a binding force causing the threaded arm to flex out of a nominal position, and wherein the lamp component is rotated by the adjustment mechanism in the second direction, opposite the first direction, about the adjustment axis to relieve the binding force and return the threaded arm to the nominal position.

18. The system of claim 11, wherein, if the beam pattern is not within the predetermined range:

the adjustment mechanism subsequently moves the lamp component in one of the first direction and second direction if the beam pattern is above the predetermined range;

the adjustment mechanism subsequently moves the lamp component in the other of the first direction and second direction if the beam pattern is below the predetermined range; and wherein once the beam pattern is within the predetermined range, the adjustment mechanism subsequently moves the lamp component by the predetermined amount in an opposite direction as compared to a final movement direction that placed the beam pattern within the predetermined range.

19. The system of claim 11, wherein the adjustment mechanism only moves the lamp component the second direction once the beam pattern is within a predetermined range.

* * * * *